(12) United States Patent
Zervas et al.

(10) Patent No.: US 7,613,792 B2
(45) Date of Patent: Nov. 3, 2009

(54) METHOD FOR DYNAMIC CACHING

(75) Inventors: Konstantin Zervas, Göteborg (SE);
Tomas Aronsson, Göteborg (SE)

(73) Assignee: Handmark, Inc., Kansas City, MO (US)

( * ) Notice: Subject to any disclaimer, the term of this patent is extended or adjusted under 35 U.S.C. 154(b) by 601 days.

(21) Appl. No.: 10/363,550

(22) PCT Filed: Sep. 11, 2001

(86) PCT No.: PCT/SE01/01935

§ 371 (c)(1),
(2), (4) Date: Mar. 5, 2003

(87) PCT Pub. No.: WO02/23910

PCT Pub. Date: Mar. 21, 2002

(65) Prior Publication Data

US 2003/0172134 A1    Sep. 11, 2003

(30) Foreign Application Priority Data

Sep. 11, 2000  (EP) ............................... 008501488
May 23, 2001  (EP) ............................... 011125499

(51) Int. Cl.
*G06F 15/16* (2006.01)
(52) U.S. Cl. ...................... 709/219; 709/213
(58) Field of Classification Search ................. 719/219, 719/213
See application file for complete search history.

(56) References Cited

U.S. PATENT DOCUMENTS

| | | | |
|---|---|---|---|
| 5,305,389 A | * | 4/1994 | Palmer ........................ 382/305 |
| 5,727,129 A | | 3/1998 | Barrett et al. |
| 5,790,935 A | | 8/1998 | Payton |
| 5,802,292 A | | 9/1998 | Mogul |
| 5,848,396 A | | 12/1998 | Gerace |
| 5,878,223 A | * | 3/1999 | Becker et al. ................ 709/223 |
| 5,963,208 A | * | 10/1999 | Dolan et al. ................ 715/760 |
| 5,978,841 A | * | 11/1999 | Berger ........................ 709/217 |

(Continued)

FOREIGN PATENT DOCUMENTS

CN    1194413 A    9/1998

(Continued)

OTHER PUBLICATIONS

Chinese Office Action and English translation of same issued on Oct. 14, 2005.

(Continued)

*Primary Examiner*—Patrice Winder
*Assistant Examiner*—Minh-Chau Nguyen
(74) *Attorney, Agent, or Firm*—Robert O. Enyard, Jr.; Polsinelli Shughart PC

(57) ABSTRACT

A method for caching media content on a client includes organizing media subjects in a predefined media package structure, and downloading the structure to the client in order for a user to consume the subjects in the structure. The media structure is arranged to allow a user to request media subjects by navigating from a current subject to adjacent subjects in the structure, and these adjacent subjects are cached at the client in advance, before the user requests them. By downloading the adjacent media subjects, the user will get the impression that the entire media structure is cached, and will not experience any download delays.

34 Claims, 4 Drawing Sheets

U.S. PATENT DOCUMENTS

| | | | |
|---|---|---|---|
| 6,023,726 A * | 2/2000 | Saksena | 709/219 |
| 6,055,569 A * | 4/2000 | O'Brien et al. | 709/223 |
| 6,182,122 B1 | 1/2001 | Berstis | |
| 6,192,340 B1 * | 2/2001 | Abecassis | 704/270 |
| 6,314,094 B1 * | 11/2001 | Boys | 370/352 |
| 6,351,755 B1 * | 2/2002 | Najork et al. | 715/501.1 |
| 6,629,097 B1 | 9/2003 | Keith | |
| 6,633,316 B1 * | 10/2003 | Maddalozzo et al. | 715/854 |
| 6,665,687 B1 * | 12/2003 | Burke | 707/104.1 |
| 6,721,780 B1 * | 4/2004 | Kasriel et al. | 709/203 |
| 6,735,628 B2 | 5/2004 | Eyal | |
| 6,735,766 B1 | 5/2004 | Chamberlain et al. | |
| 6,747,597 B2 | 6/2004 | Choi | |
| 6,769,009 B1 | 7/2004 | Reisman | |
| 6,769,019 B2 * | 7/2004 | Ferguson | 709/219 |
| 6,901,433 B2 * | 5/2005 | San Andres et al. | 709/216 |
| 6,917,960 B1 * | 7/2005 | Decasper et al. | 709/203 |
| 6,938,207 B1 * | 8/2005 | Haynes | 715/711 |
| 7,047,485 B1 * | 5/2006 | Klein et al. | 715/513 |
| 7,062,765 B1 | 6/2006 | Pitzel et al. | |
| 7,099,946 B2 | 8/2006 | Lennon et al. | |
| 7,174,534 B2 | 2/2007 | Chong et al. | |
| 7,281,034 B1 * | 10/2007 | Eyal | 709/219 |
| 2004/0030798 A1 | 2/2004 | Andersson et al. | |

FOREIGN PATENT DOCUMENTS

| | | |
|---|---|---|
| WO | 98/28906 | 7/1998 |
| WO | WO 98/28906 | 7/1998 |
| WO | WO99/15968 | 4/1999 |
| WO | 00/39666 | 7/2000 |
| WO | 01/03011 | 1/2001 |
| WO | 01/54403 | 7/2001 |
| WO | 02/095619 | 11/2002 |

OTHER PUBLICATIONS

Reddy M., et al., "An Adaptive Mechanism for Web Browser Cache Management", IEEE Internet Computing, IEEE Service Center, Piscataway, NJ, Jan. 1998, pp. 78-81, XP002194366.

Markatos et al., "A Top-10 Approach to Prefetching on the Web", Technical Report Forth-ICS, XX, XX, No. TR-173, Aug. 1996, pp. 1-15, XP002104432.

Wang Z., et al., "Prefetching in World Wide Web", Global Telecommunications Conference, 1996, Globecom '96, Communications: The Key to Global Prosperity London, UK 18-22, Nov. 1996, New York, NY, IEEE, Nov. 18, 1996, pp. 28-32, XP010220168.

"Spyglass Prism 3.1 Supports the Latest Standards for Transmission of Content to Wireless Devices", Online Article, pp. 1-3, Feb. 12, 2001.

Naghshineh, M. et al.: "End-to-end QOS Provisioning in Multimedia Wireless/Mobile Networks Using an Adaptive Framework", *IEEE Communications Magazine US IEEE Service Center*, vol. 35, No. 11, pp. 72-81, Nov. 1, 1997.

Pointcast, Online Article, Jan. 14, 2002.

International Search Report, dated May 2, 2002, PCT/SE01/01935, A Method for Dynamic Caching, 3 pages.

International Preliminary Examination Report, dated Nov. 12, 2002, PCT/SE01/01935, A Method for Dynamic Caching, 4 pages.

Written Opinion, dated Aug. 28, 2002, PCT/SE01/01935, A Method for Dynamic Caching, 3 pages.

Communication Pursuant to Article 92(2) EPC, dated Apr. 20, 2005, Application No. 01 112 549.9-1522, 5 pages.

Written Opinion, dated Sep. 15, 2003, PCT/EP02/05006, Method for Optimizing Utilization of Client Capacity, 7 pages.

International Search Report, dated Nov. 25, 2002, PCT/EP02/05006, Method for Optimizing Utilization of Client Capacity, 3 pages.

International Preliminary Examination Report, Nov. 21, 2003, PCT/EP02/05006, Method for Optimizing Utilization of Client Capacity, 4 pages.

Office Action, dated Aug. 7, 2007, U.S. Appl. No. 10/478,366, Method for Optimizing Utilization of Client Capacity, 8 pages.

* cited by examiner

METHOD FOR DYNAMIC CACHING

This application is the national phase under 35 U.S.C. § 371 of PCT International Application No. PCT/SE01/01935 which has an International filing date of Sep. 11, 2001, which designated the United States of America, and which claims priority on European Patent Application No. 01112549.9 filed May 23, 2001 and European Patent Application No. 00850148.8 filed Sep. 11, 2000, the entire contents of each of which are hereby incorporated by reference.

TECHNICAL FIELD

The present invention generally relates to a method for providing media contents to a user. More specifically, it is concerned with how to cache data at a client when consuming media for improving the media experience when the bandwidth is limited.

TECHNICAL BACKGROUND

The definition of limited bandwidth depends on the media. For example, video sent over Internet today has limitations, while text is practically without limits, as the download time is usually negligible compared to the time required for reading it. Even though the main focus in this text is on mobile devices like phones or PDAs the same techniques could be used at higher bandwidths for other types of media.

There are basically three techniques for caching media content accessed over a data network, e.g. the Internet, on a handheld device.

1. Package Download.

An example of this approach is the AvantGo system, applicable for example with a Palm Pilot device.

The user downloads and stores (caches) a package comprising several media clips, and then navigates among these clips. No Internet connection is required during consumption, as the entire package, with all its media contents, is downloaded and stored in the handheld device. On the other hand, the media experience will be limited to the contents of the downloaded package. It is costly to include extensive media contents, especially if the download is over a mobile communication link.

2. Streaming.

The user receives a continuous stream of media, equivalent to listening to a CD or a radio station. In this case, the client is adapted to download one single media clip, and playback this clip during download.

The simultaneous playback and download is accomplished by caching in the clients memory, and requires an uninterrupted internet connection, preferably a wide band connection. The user has limited ways to control the media experience, at best a one dimensional navigation, i.e. stop, play, back and fast forward.

3. Web Browser Caching

Although primarily used in stationary clients (workstations), web browsing may be implemented in for example a WAP-telephone or a GPRS- or UMTS-device, connected continuously to a network.

While providing the user with a dynamic media experience, browsing has the drawback that contents are only downloaded and cached when the user request them, leading to disturbing delays. An accessed web page (including media files like pictures) will normally be saved on the client for a specified time in order to speed up future access to the same web page. This does not, however, address the problem of delays when requesting new information.

It is clear from the above, that an increased dynamics in the media experience (free browsing) is gained only to the price of a unsatisfactory caching procedure, where the caching is always one step behind the user. On the contrary, access without caching interruptions, e.g. wide band streaming or AvantGo type package systems, gives little, if any, dynamics in the media experience. Prior art gives no solution to the problem of providing a satisfying media experience, without regular interruption by caching.

SUMMARY OF THE INVENTION

A first object of an embodiment of the invention is to provide a method for caching of media contents, enabling the user to have a satisfying media experience, with a minimum of interruptions.

A further object of an embodiment of the invention is to provide a method for caching of media content minimizing the cost for a satisfying media experience.

According to an embodiment of the invention, this and other objects are achieved by arranging the media structure to allow a user to request media subjects by navigating from a current subject to adjacent subjects in the structure, and to cache adjacent subjects at the client in advance, before the user requests them.

This "pre-caching" is similar to the caching mentioned above in relation to web browsing, especially when revisiting a site that was recently visited, in which case several "adjacent", i.e. linked, pages are already cached at the client. However, the important difference is that a web browser never tries to predict which links (to other web pages) the user will access and pre-cache these web pages in order to speed up the access to these pages. In fact, in normal, unrestricted web browsing, this would be quite troublesome. An embodiment of the present invention makes use of the fact that the users navigation within the media structure is restricted to a few directions, thus reducing the number of subjects that need to be cached.

By downloading the adjacent media subjects, the user will get the impression that the entire media structure is cached, and will not experience any download delays, under the condition that the adjacent subjects always can be downloaded during the time the user consumes the current media subject.

In an embodiment of the invention, the method further comprises determining, for a subset of subjects in the structure, the following factors:

distance to the subject from the current subject, approximated consumption time of any intermediate subjects between the subject and the current subject, download time of the subject, and, by weighting said factors, prioritizing the subjects in said subset and caching subjects in an order based on this prioritization.

When a user navigates in the media structure, normally configured as a "tree" of pieces of media contents ("subjects"), the users next move is very limited. However, even after two or three moves, the number of reachable points in the tree is large enough to make caching of all these pieces of media contents too time consuming to be efficient. The weighting of the mentioned factors to form a priority order, will provide for a systematic selection process, enabling caching of the "right" media subjects. The factors can also include a prediction of which subjects the user is most likely to navigate to.

The subjects in the subset can be ordered in a list, and the client can cache subjects in this order, to the extent there is cache memory available. In the event of insufficient cache memory, cached subjects, outside said subset can be identified and erased from the cache memory. It may be advantageous to erase consumed subjects before unconsumed.

In another embodiment, the method further comprises defining two modes of navigation of the client, a first, continuous navigation mode, characterized by restricted movement between subjects being located adjacent in the structure, and a second, discontinuous mode, characterized by unrestricted movement between subjects, determining which mode of navigation the user is currently using, and basing said prediction on the currently used mode of navigation.

This functionality improves the intelligent caching of subjects, by keeping track of how the user navigates, and letting this information influence the caching procedure.

BRIEF DESCRIPTION OF THE DRAWINGS

These and other aspects of the invention will be apparent from the preferred embodiments more clearly described with reference to the appended drawings.

DETAILED DESCRIPTION OF THE PREFERRED EMBODIMENTS

The currently preferred embodiment is related to the concept of Mediabricks'™ magazines. This should not be regarded as a limitation to the scope of the appended claims, but only as an example of a situation where an embodiment of the present invention may be implemented successfully.

Figure 1:
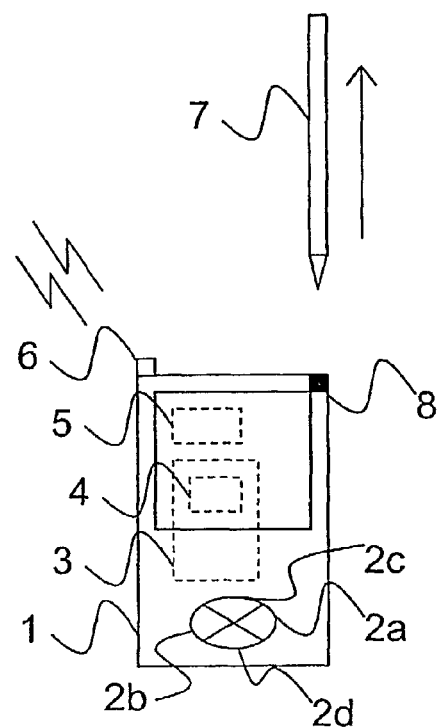
FIG. 1 shows an example of a handheld mobile device, suitable for implementation of an embodiment of the present invention.

The client is assumed to be a handheld mobile communication device with media playback functionality, such as the PDA 1 illustrated in FIG. 1.

DEFINITIONS

In this description of the preferred embodiment, a few terms are given a special meaning:

1. Media subject—a piece of media contents, further organized in different layers. Each subject can have audio, video, images, text etc.
2. Magazine—a collection of media subjects, organized in a defined media package structure.
3. Current media subject—the subject in the package structure a user is currently consuming (reading, watching, listening to etc).

In order to provide a satisfying media experience, the user should be able to consume the subjects in the structure without having to wait for new subjects to be downloaded to the mobile device. As mentioned above, one way to avoid interrupts while consuming the data is to load everything before it is consumed. The approach with Mediabricks'™ magazines is to:

Be on-line while reading, having access to the latest information

Initially only load the description (structure) of the magazine

Only download the subjects that the user wants to consume

Load at least a whole subject before consuming, i.e. no streaming media.

The basic idea is to download new subjects to the device while the current subject is consumed. In other words, the download time of additional subjects is restricted to the time a user needs to consume the current media subject. The result is similar to streaming, but with improved flexibility for the user, and the added complexity of not knowing the next subject or the time the user will spend on the current subject.

Download Time

The time to download a subject includes:

Request from client to server

Time for the server to process the request

Result from server to client

Download time related to the size of the subject and the bandwidth

Time for the client to cache the result

The time for a request to go to the server and an empty result to go back is not dependent on the size of a subject. Neither is the time needed for the server to process the request given that the server is reasonable fast. The caching time in the client has both a fixed and size dependent part.

Generally the download time can be seen as a fixed time for each subject and a variable time dependent on the size. If the fixed part is a larger than the variable it is better trying to cache several subjects in one request to decrease the overhead time for each subject. Another thing to consider is that the request and results probably are using a packet based protocol and it is advantageous to fill every packet with data instead of using half the packets. In the following description it is assumed that the size dependent time for a request is a lot longer than the fixed part. When this is not the case, e.g. when using satellite communication with significant initialization times, the described method should be slightly adjusted by the skilled man.

The load on the network or server has an impact on each client. When a mobile user changes carrier, for example from a GPRS connection to a radio LAN, the download times changes too. The mobile device should adjust the expected download time accordingly by keeping statistics from earlier downloads. By simply measuring the download time for the last N downloads (again, assuming that the smaller fixed part is negligible), and relating it to the number of downloaded bytes, an estimated average download rate can be determined:

expected bytes/second=average(Size$N$/Downloadtime$N$)

Consumption Time

The consumption time is the time the user is expected to spend at each subject. Depending on the media type it is more or less predictable:

Audio—given in the file format, for example the length of an mp3-file, provided of course that the user does not fast forward etc.

Text—related to the length of the text, but also the reading speed for each user. By collecting statistics of the user's reading speed and behavior it should be possible to determine a reasonable estimate.

Pictures—difficult to estimate. An approximation can be based on user behavior, for example average time spent on each picture when browsing an on-line album with photographs.

In reality the expected consumption time will not be exact. A user might jump to another subject before the current one is consumed or the estimation could be wrong. Statistical data can be collected to improve the estimation. Note that the statistics should ignore very short stops, or skips, when the user moves over a subject without consuming it at all.

Navigation Mode 1

Navigation in a magazine can be done by using navigation buttons 2 on the PDA 1, intended for this purpose. This type of navigation is referred to as mode 1 navigation. In a typical case, which will be further described below, the PDA has four buttons 2a-d: forward 2a, backward 2b, up 2c and down 2d. When navigating in the magazine with these buttons, the user can only move in these four directions: forward—next subject on the same level, back—previous subject on the same level, down—move to a more detailed level, up—move to a more general level. This is more restricted movement than in a typical web browser, and this restriction facilitates an intelligent dynamic caching. By knowing to what subjects the user can navigate to from the currently consumed subject, it is possible to predict the next subject and download it to the device while the current subject is consumed.

It is also possible that the PDA also has an automatic mode, in which the media player automatically continues to the next subject after a subject is consumed. The "next" subject may be defined by a predetermined path through the magazine, either decided by the content provider or by user preferences. Automatic mode can be regarded as a special case of mode 1 navigation. The magazines should preferably be constructed so the typical consumer is happy with the predetermined path and only does a few explorations into interesting articles.

To enhance the media experience, subject are cached in the PDA memory 3, and ideally a subject is cached just before the user navigates to it.

Selection Process

Figure 2:
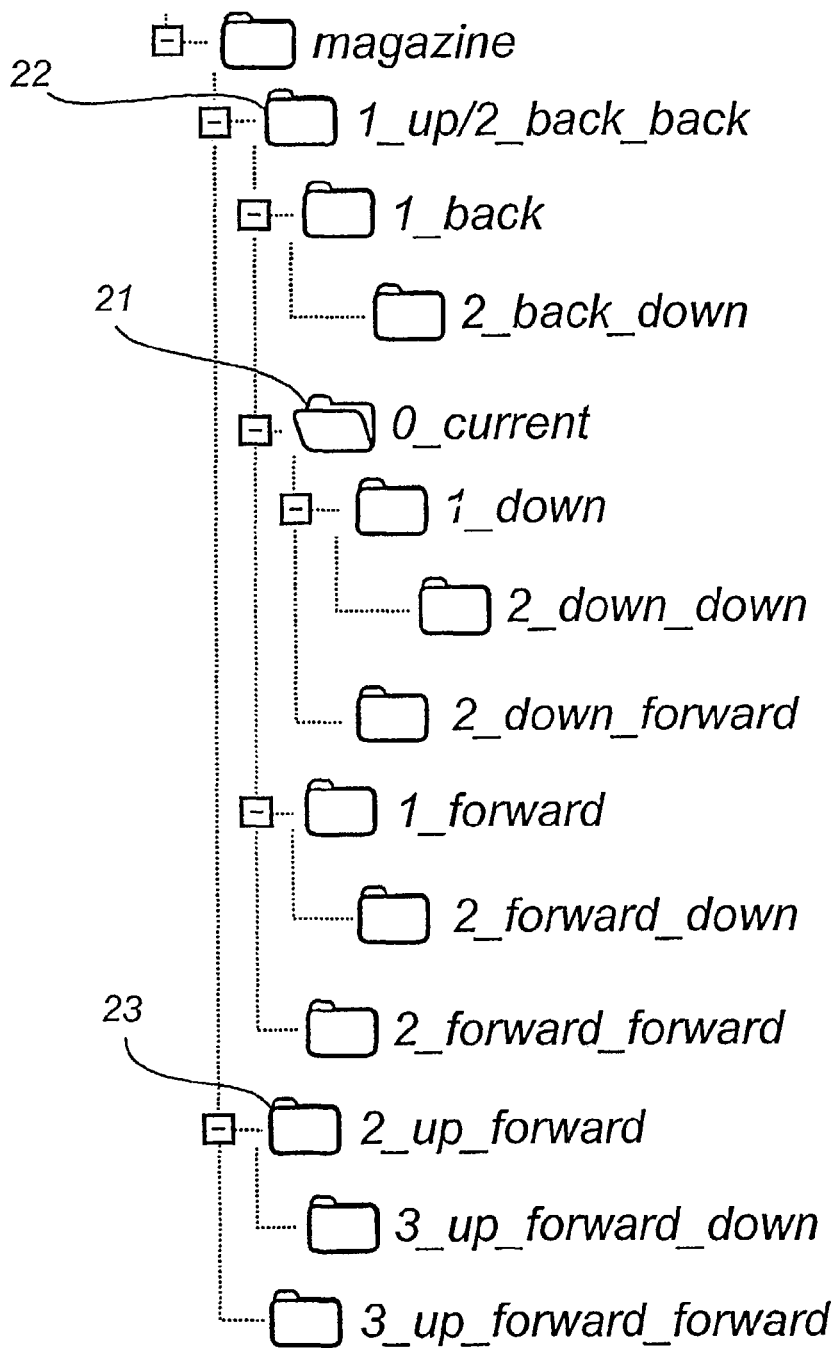
FIG. 2 shows an example of a magazine structure according to a preferred embodiment of the invention.

FIG. 2 gives an example of a magazine structure with a currently consumed subject, 0_current 21. As mentioned above, it is possible to move in four directions: forward, backward, up and down. All the subjects that are reachable within two moves are shown in the structure, and are labeled 1_<direction> or 2_<direction1>_<direction2>.

In this example, up is assumed to lead to the "parent" subject 22, i.e. the subject on the closest more general level leading to the current subject 21. Alternatively, up leads to the next subject 23 on the parent level, in which case the user does not need to revisit the subject 22, which has previously been visited.

The back direction normally indicates the previous subject on the same level, but when the first subject on a level is reached, back will lead to the parent. In the figure, this is illustrated by the fact that the parent subject 22 can be reached by pressing back twice (2_back_back).

The only way the current subject 21 (0_current) could have been reached the first time, i.e. not through a child level, is through the subject 1_back. Therefore, 1_back is always cached when the user is at 0_current. Further, the only way to reach the subjects on the current level is through the parent subject 22, which means that 1_up is also cached.

From this follows that, if the 1_down and 1_forward subjects are cached for each visited subject, and no subjects are cached out, then the subjects 1_back and 1 up are already cached for any subject that the user may navigate to. In other words it will be enough to cache 1_down and 1_forward, two new subjects, during the time 0_current is consumed. If there is enough time to do this for every subject our goal is achieved, and the user never has to wait for any new subject to be loaded.

If the average consumption time is less than twice the average download time the situation is difficult and the device will often be out of data. The magazines should therefore be designed so the average consumption time is larger than the download times. The ratio between the average consumption time and the download time can be used as a measurement of how good a magazine is for caching.

Figure 3:
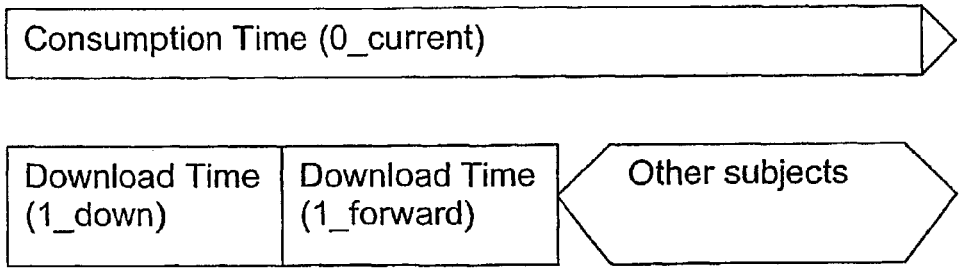
FIG. 3 shows a time line of consumption time vs. download times.

There will be errors both in the estimated consumption time and in the download times. A special case of consumption time error is when the user chooses not to consume a subject, but moves on directly (zapping). When such deviations from the estimations occur, it is possible that a subject that is not in the cache will be reached. By trying to cache the subjects more than one step from current subject the risk is decreased. The time to load these subjects is the remaining time after 1_down and 1_forward has been cached (see FIG. 3), ie: consumption time (0_current)−download time (1_forward)−download time (1_down).

If the caching is extended to two steps away from the current subject, 6 subjects can be reached in the structure in FIG. 2. (Not counting 2_back_back which is equal to 1_up). Even if the client memory 3 were sufficient to cache all these subjects, the consumption time of the present subject might be too short for this. Therefore, an intelligent selection process is required, which is implemented in the PDA as a software 4 controlling the processor 5 and communication interface 6. If the client memory 3 is insufficient, this requirement is even more evident.

Note that such a selection process not should be limited to subjects two steps away from the current subject. Rather, the selection should be made unbiased to all factors, in order to accomplish a dynamic caching of subjects resulting in a satisfying media experience. It might be the case that a 3-step subject is selected before a 2-step subject, if the circumstances are such.

Different selection criteria can be identified for determining which subjects to cache:

Steps to the Subject

Naturally, as mentioned above, the subjects immediately next to the currently consumed subject should always be cached. After that, the priority is roughly inversely proportional to the distance from the current subject.

Time To Consumption

By adding all the consumption times for all the subjects on the path to a subject, the estimated time before that subject is needed can be computed. It can be realized that a subject that is "hidden" behind a closer subject with a long consumption time, can be given a low caching priority. It can instead be cached while this closer subject is being consumed.

Download Time

If the download time for a certain subject is long it might be better to chose another subject which will be loaded in time and hope that the user chooses that path. The same reasoning could be applied to a string of related subjects.

Consumption Patterns

For certain packages the consumer might follow a similar path each time. This path should be remembered by the device by keeping statistics for each subscribed magazine, so that this path can be prioritized. Some users might want to consume all subjects on a particular path before moving on to a different path.

Preferences

Variables influencing the consumption may be defined by the user or the media content provider. Tagging by the media subjects may be used to enable the user to prioritize certain types of subjects.

Links

A subject may relate to another subject, possibly in a different magazine, and that a direct link can be built into the structure.

Each criteria should have a weight, ie multiplication factor, attached to them. Depending on how the device is used, the weights should adjust to learn the user's behavior. By adding the criteria for each subject can the cache points can be calculated and the subject with the most cache points is the next one to be downloaded.

Figure 4:
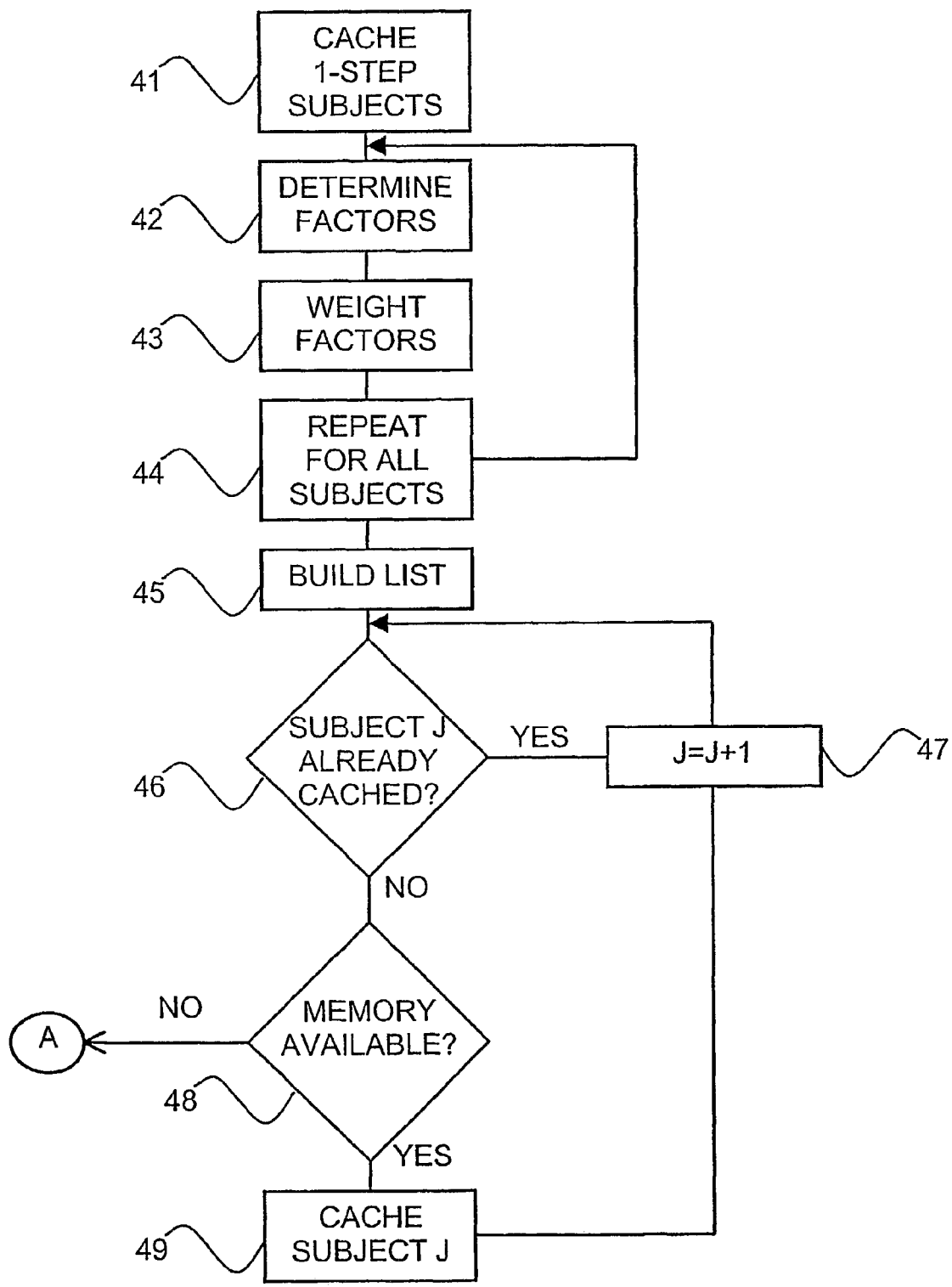
FIG. 4 shows a flowchart of a caching procedure according to a preferred embodiment of the invention.

With reference to FIG. 4, a preferred selection process will now be described in further detail.

First, in step 41, all subjects one step away from the current subject are cached. As mentioned above, this normally means maximum two new cached subjects.

In step 42, a number of factors are calculated for a subject, and in step 43, a priority is determined this subject by weighting the different factors:

priority=
$W1 \times$ time to consumption
$+W2 \times$ time for download
$+W3 \times$ probability for direct move
$+W4 \times$ additional factors.

The steps 42 and 43 are repeated for all subjects within N steps from the current subject (step 44), and in step 45 the resulting priorities are ordered in a sorted list. The value of N is dependent upon the available processing capacity, and indirectly the available memory. Even if the processor can perform the steps 42-45 for all subject within the required time, this will not improve the selection process unless the memory can cache more subjects.

In step 46, it is checked if the subject with index j (the index j starting at the top of the list, with the subject with the highest priority) is already cached. If this is the case, the program control increases j by one (step 47) and returns to step 6 and performs the check for the following subject. However, if the subject is not cached, program control proceeds to step 48, where it is checked if there is enough cache memory available to cache the subject. If this is the case, the subject is cached (step 49), and program control continues to step 47, where j is increased, and then returns to step 46 again.

If there is not enough cache memory in step 48, program control proceeds to an cache out routine in steps 50-55 (cache out=erase previously cached subjects from memory). In step 51, it is checked if there are read subjects located at least a predefined distance "behind" the current subject. The direction "behind" is defined in a way so as to corresponding to areas of the structure that have been passed by the user. The distance should be greater than N steps, i.e. only subjects outside the prioritized list are cached out. If read subjects are found, one of these is cached out in step 52, and program control returns to step 48. Otherwise, in step 53, it is checked if there are unread subjects located at least a predefined distance behind the current subject (possibly different from the distance in step 50). If so, one of these subjects is cached out in step 54, and program control returns to step 48. Otherwise, in step 55, the subject at the end of the list is cached out and program control returns to step 48.

It is sometimes advantageous to return all the way to step 42 each time a subject has been cached in or out, as this possibly results in a change in the factors determining the priority order. Alternatively, a control is performed each time a subject is cached in or out, to find out if a return to step 42 is deemed necessary. A third alternative may be to return to step 42 at regular intervals, e.g. every 4 cachings.

According to this procedure, the memory will eventually be filled with the subjects with the highest priority as defined in step 43. However, the process may be interrupted at any time, by the user initiating a move. Each time this happens, the program control restarts with step 41.

Navigation Mode 2

Returning to FIG. 1, the PDA 1 intended for use with the Mediabrick™ concept may also have means for direct navigation, in the case shown in FIG. 1 with the use of a pointing device 7, such as a pen. When the user moves between subjects using such means, the restrictions of the magazine structure are lost, and certain factors mentioned above, such as distance to the current subject, become less important, as the user may suddenly move to any subject available in the structure. Instead, other factors become more important for selecting which subjects should be cached, typically factors related to user behavior.

According to the preferred embodiment, the client is provided with means for determining which navigation mode is being used by the user, and to adapt the caching process to the navigation mode. In FIG. 1, this is illustrated by a sensor 8, arranged to detect when the pen 7 is removed from the PDA 1.

Figure 5:
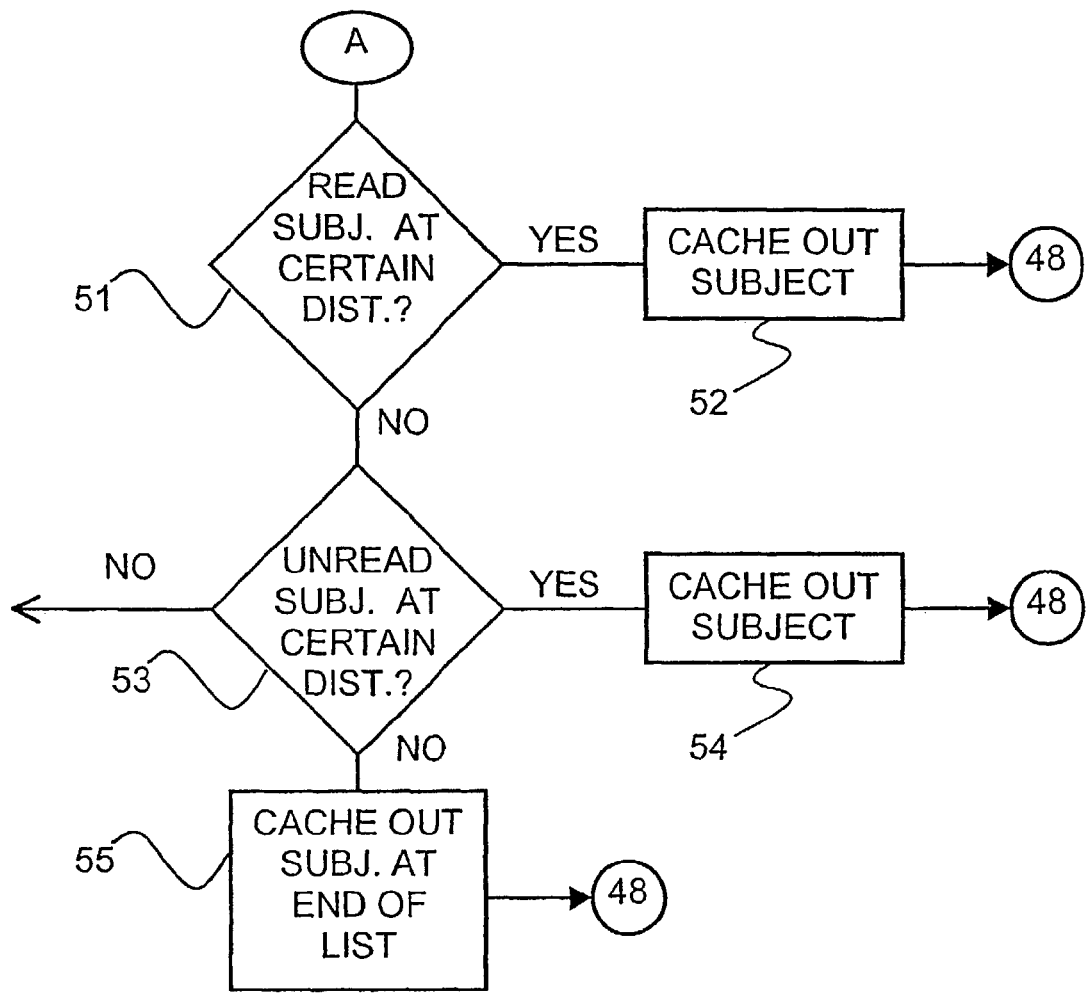
FIG. 5 shows a flowchart of a caching out procedure according to a preferred embodiment of the invention.

Upon removal of the pen 7, the weights W1-W4 above are altered in order to increase the importance of e.g. user preferences and consumption patterns. The result is a completely different caching strategy, albeit governed by the same process, outlined in FIGS. 4-5. In certain cases, it might be considered to even cancel the step 41, i.e. to choose not to cache immediately neighboring subjects.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method for caching content retrieved from a server in a memory of a mobile device comprising:
    generating a content request at the mobile device in response to an input at the mobile device, the content request identifying a current media subject to download;
    retrieving the current media subject and a media package structure associated with the current media subject to the mobile device, the media package structure identifying the current media subject, a plurality of other media subjects, and a navigation path having at least three different directions from the current subject to the plurality of other media subjects;
    consuming the current media subject at the mobile device;
    downloading at least two of the plurality of other media subjects identified in the media package structure that are adjacent to the current media subject along the navigation path, the at least two of the plurality of other media subjects not being either previously requested or directly referenced by the current media subject, and caching the at least two other media subjects in the memory while the current media subject is being consumed;
    determining a download priority for the plurality of other media subjects as a function of a plurality of caching criteria; and
    downloading at least another one of the plurality of other media subjects for caching in the memory as function of the determined priority.

2. The method of claim 1 further comprising:
    generating a list comprising each of the plurality of other media subjects sorted according to the determined priority; and
    downloading the at least one other one of the plurality of other media subjects for caching in the memory based on an order of the at least one other one of the plurality of other media subjects in the generated list.

3. The method of claim 2 further comprising:
determining if an amount of available storage space in the memory is sufficient for storing a next one of the plurality of other media subjects in the generated list; and
only caching the next one of the plurality of other media subjects in the memory if the amount of available storage space is sufficient.

4. The method of claim 1 further comprising:
identifying cached subjects in the memory that are not included in the plurality of other media subjects; and
erasing the identified cached subjects from the memory.

5. The method of claim 4 further comprising automatically enabling restricted movement along the navigation path from the current subject to a next one of the plurality of other media subjects after the current media subject has been consumed.

6. The method of claim 1 wherein the at least three different directions from the current media subject to the plurality of other media subjects are restricted to a predetermined set of directions selected from a group consisting of a forward direction, a backward direction, a downward direction, and an upward direction.

7. The method of claim 1 further comprising generating the input through an input component selected from a group consisting of a plurality of navigation keys and a pointing device.

8. The method of claim 1 wherein determining the download priority comprises:
calculating a plurality of caching factors for each of the plurality of other media subjects; and
weighting each of the plurality of caching factors for each of the plurality of other media subjects to determine the download priority.

9. The method of claim 8 wherein the caching factors for each of the plurality of other media subjects comprise:
an estimated time to consumption for each of the plurality of the other media subjects;
a download time for each of the plurality of the other media subjects;
a probability of direct navigation to each of the plurality of the other media subjects; and
a distance between each of the plurality of the other media subjects and the current media subject.

10. The method of claim 1 further comprising:
determining a navigation mode of the mobile device, the navigation mode being selected from:
a first navigation mode in which the mobile device is responsive to input received through a plurality of navigation keys to enable restricted movement from the current subject to the plurality of other media subjects; and
a second navigation mode in which the mobile device is responsive to input received through a pointing device to enable unrestricted restricted movement from the current subject to the plurality of other media subjects.

11. The method of claim 1 wherein the content comprises at least one member of a media group consisting of audio, video, an image, and text.

12. The method of claim 1 wherein the predefined structure comprises a magazine.

13. The method of claim 1 wherein average consumption time of the current subject is greater than the download time of the plurality of other media subjects.

14. The method of claim 1 wherein the mobile device comprises at least one member of a group consisting of a mobile media playback device, a personal digital assistant, and a phone.

15. A method for caching content in a memory of a first processing device comprising:
generating a content request at the first processing device in response to input received at the first processing device, the content request identifying a current media subject to download from a second processing device;
retrieving the current media subject and a media package structure associated with the current media subject from the second processing device to the first processing device, the media package structure identifying the current media subject, a plurality of other media subjects a plurality of other media subjects, and a navigation path having at least three different directions from the current subject to the plurality of other media subjects;
consuming the current media subject at the first processing device;
downloading at least two of the plurality of other media subjects that are one step away from the current media subject along the navigation path, the at least two of the plurality of other media subjects not being either previously requested or directly referenced by the current media subject, and caching the at least two of the plurality of other media subjects in the memory while the current media subject is being consumed;
determining a download priority for each of the plurality of other media subjects as a function of a plurality of caching criteria;
generating a list comprising each of the plurality of other media subjects sorted according to their corresponding determined priority; and
downloading at least another one of the plurality of other media subjects from the second processing device based on an order of the at least one other one of the plurality of media subjects in the generated list for caching in the memory.

16. The method of claim 15 wherein determining the download priority comprises:
calculating a plurality of caching factors for each of the plurality of other media subjects; and
weighting each of the plurality of caching factors for each of the plurality of other media subjects to determine the download priority.

17. The method of claim 16 wherein the caching factors for each of the plurality of other media subjects comprise:
an estimated time to consumption for each of the plurality of the other media subjects;
a download time for each of the plurality of the other media subjects;
a probability of direct navigation to each of the plurality of the other media subjects; and
a distance between each of the plurality of the other media subjects and the current media subject.

18. The method of claim 15 wherein the at least three different directions from the current media subject to the plurality of media subjects are restricted to a predetermined set of directions selected from a group consisting of a forward direction, a backward direction, a downward direction, and an upward direction.

19. The method of claim 15 further comprising generating the input through an input component selected from a group consisting of a plurality of navigation keys and a pointing device.

20. The method of claim 15 further comprising:
   determining a navigation mode of the first processing device, the navigation mode being selected from:
      a first navigation mode in which the first processing device is responsive to input received through a plurality of navigation keys to enable restricted movement from the current subject to the plurality of other media subjects; and
      a second navigation mode in which the first processing device is responsive to input received through a pointing device to enable unrestricted movement from the current subject to the plurality of other media subjects.

21. A method for caching content retrieved from a server in a cache memory of a mobile device comprising:
   generating a content request at the mobile device in response to input received at the mobile device, the content request comprising an identification of a current media subject to download;
   downloading, at the mobile device, the current media subject and a predefined structure associated with the current media subject, the predefined structure identifying the current media subject, a plurality of other media subjects, and a navigation path having at least three different directions from the current subject to the plurality of other media subjects;
   consuming the current media subject at the mobile device;
   determining whether a navigation mode of the mobile device is a first navigation mode or a second navigation mode, the first navigation mode corresponding to restricted movement between the current media subject and the plurality of other media subjects and the second navigation mode corresponding to unrestricted movement between the current media subject and the plurality of other media subjects;
   downloading at least two of the plurality of other media subjects identified in the predefined structure that are adjacent to the current media subject, the at least two of the plurality of other media subjects not being either previously requested or directly referenced by the current media subject, and caching the at least two of the plurality of other media subjects in the memory while the current media subject is being consumed;
   assigning a download priority to each of the plurality of other media subjects as a function of a plurality of caching criteria and the determined navigation mode;
   generating a list comprising each of the plurality of other media subjects sorted according to their assigned priority; and
   downloading at least another one of the plurality of other media subjects based on an order of the at least one other one of the plurality of other media subjects in the generated list for caching in the memory.

22. The method of claim 21 wherein determining the navigation mode comprises determining the first navigation mode when the input is received through a plurality of navigation keys on the mobile device, the navigation keys enabling the restricted movement between the current media subject and the plurality of other media subjects, and determining a second navigation mode when the input is received through a pointing device for the mobile device, the pointing device enabling the unrestricted movement between the current media subjects and the plurality of other media subjects.

23. The method of claim 22 further comprising automatically enabling restricted movement along the navigation path from the current subject to a next one of the plurality of other media subjects after the current media subject has been consumed.

24. The method of claim 22 further comprising:
   detecting a removal of the pointing device from the mobile device; and
   determining the navigation mode to be the second navigation mode when the removal of the pointing device is detected.

25. The method of claim 21 wherein the content comprises at least one member of a media group consisting of audio, video, an image, and text.

26. The method of claim 21 wherein the predefined structure comprises a magazine.

27. The method of claim 21 wherein average consumption time of the current subject is greater than the download time of the plurality of other media subjects.

28. The method of claim 21 wherein the mobile device comprises at least one member of a group consisting of a mobile media playback device, a personal digital assistant, and a phone.

29. The method of claim 21 further comprising:
   determining if an amount of available storage space in the memory is sufficient for storing a next one of the plurality of other media subjects in the generated list; and
   only caching the next one of the plurality of other media subjects in the memory if the amount of available storage space is determined to be sufficient.

30. The method of claim 21 wherein the at least two of the plurality of other media subjects are each one step away from the current media subject along the navigation path having the at least three navigation paths, and wherein the at least one other one of the plurality of other media subjects is at least two steps away from the current media subject along the navigation path.

31. A method for caching content from a server in a memory of a processing device comprising:
   generating a content request at the mobile device in response to an input at the mobile device, the content request identifying a current media subject to download from the server;
   retrieving the current media subject and a media package structure associated with the current media subject to the processing device, the media package structure identifying the current media subject, a plurality of other media subjects and at least four different navigation directions from the current subject to the plurality of other media subjects, the at least four different navigation directions corresponding to a forward direction, a backward direction, an upward direction, and a downward direction;
   consuming the current media subject at the processing device; and
   downloading at least two of the plurality of other media subjects identified in the media package structure that are adjacent to the current media, the at least two of the plurality of other media subjects not being either previously requested or directly referenced by the current media subject, and caching the at least two of the plurality of other media subjects in the memory while the current media subject is being consumed.

32. The method of claim 31 wherein the forward direction enables movement to a next subject on a same level as the current subject, the backward direction enables movement to a previous subject on the same level, the downward direction enables movement to a more detailed level, and the upward direction enables movement to a more general level.

33. A method for caching content retrieved from a server in a memory of a mobile device comprising:

generating a content request at the mobile device in response to an input received at the mobile device, the content request identifying a current media subject to download from the server;

retrieving the current media subject and a media structure associated with the current media subject from the server, the media package structure identifying the current media subject, a plurality of other media subjects and at least four different navigation directions from the current subject to the plurality of other media subjects, the at least four navigation different directions corresponding to a forward direction, a backward direction, an upward direction, and a downward direction;

consuming the current media subject at the mobile device;

downloading at least two of the plurality of other media subjects identified in the media package structure that are adjacent to the current media subject, the at least two of the plurality of other media subjects not being either previously requested or directly referenced by the current media subject, and caching the at least two of the plurality of other media subjects in the memory while the current media subject is being consumed; and downloading at least another one of the plurality of other media subjects for caching in the memory as function of a plurality of caching criteria.

34. A method for caching content retrieved from a server in a cache memory of a mobile device comprising:

generating a content request at the mobile device in response to input received at the mobile device, the content request comprising an identification of a current media subject to download;

determining a navigation mode of the mobile device;

downloading, at the mobile device, the current media subject and a predefined structure associated with the current media subject from the server, the predefined structure identifying the current media subject, a plurality of other media subjects and a navigation path having at least three different directions from the current subject to the plurality of other media subjects;

consuming the current media subject at the mobile device;

determining whether a navigation mode of the mobile device is a first navigation mode or a second navigation mode, the first navigation mode corresponding to restricted movement between the current media subject and the plurality of other media subjects and the second navigation mode corresponding to unrestricted movement between the current media subject and the plurality of other media subjects;

downloading at least two of the plurality of other media subjects identified in the predefined structure that are adjacent to the current media subject, the at least two of the plurality of other media subjects not being either previously requested or directly referenced by the current media subject, and caching the at least two of the plurality of other media subjects in the memory while the current media subject is being consumed; and downloading at least another one of the plurality of other media subjects for caching in the memory based on a plurality of caching criteria and the determined navigation mode.

* * * * *